United States Patent [19]
Galbani

[11] Patent Number: 5,096,357
[45] Date of Patent: Mar. 17, 1992

[54] APPARATUS FOR REMOVING YARN BOBBINS AND DEPOSITING THEM ON A PEG TROLLEY

[75] Inventor: Benito Galbani, Pordenone, Italy
[73] Assignee: Savio, S.p.A., Pordenone, Italy
[21] Appl. No.: 590,607
[22] Filed: Sep. 25, 1990
[30] Foreign Application Priority Data
  Sep. 25, 1987 [IT] Italy ................ 22027 A/87
[51] Int. Cl.$^5$ .............................. B65G 25/00
[52] U.S. Cl. ........................ 414/331; 414/908;
  414/911; 414/728; 414/273; 414/744.2;
  414/626; 198/487.1; 242/35.5 A
[58] Field of Search ............ 414/661, 273, 274, 275,
  414/276, 277, 278, 280, 281, 282, 283, 331, 589,
  590, 626, 680, 744.2, 750, 749, 908, 910, 911,
  786; 198/486.1, 487.1, 409; 242/79.58, 58.6,
  131.1, 35.5 A

[56] References Cited
U.S. PATENT DOCUMENTS

| | | | |
|---|---|---|---|
| 2,451,975 | 10/1948 | Raybum et al. | 414/908 X |
| 3,924,762 | 12/1975 | Igel | 414/331 |
| 3,999,665 | 12/1976 | Rogers | 414/911 X |
| 4,153,211 | 5/1979 | Lenk et al. | 414/911 X |
| 4,226,567 | 10/1980 | Van Orsdale, Jr. | 414/728 X |
| 4,555,215 | 11/1985 | Raasch et al. | 414/331 X |
| 4,669,942 | 6/1987 | Nagasawa | 414/331 |
| 4,708,574 | 11/1987 | Conboy et al. | 414/908 X |
| 4,721,262 | 1/1988 | Langen | 414/331 X |
| 4,729,709 | 3/1988 | Raasch | 414/908 X |
| 4,763,773 | 8/1988 | Kawarabeshi et al. | 198/409 |
| 4,783,021 | 11/1988 | Nagasawa | 414/908 X |
| 4,810,155 | 3/1989 | D'Agnola | 414/331 |

FOREIGN PATENT DOCUMENTS

| | | | |
|---|---|---|---|
| 3244925 | 6/1984 | Fed. Rep. of Germany . | |
| 215761 | 11/1984 | Fed. Rep. of Germany | 414/728 |
| 8321639 | 7/1985 | Fed. Rep. of Germany . | |
| 3441778 | 5/1986 | Fed. Rep. of Germany . | |
| 3627569 | 2/1987 | Fed. Rep. of Germany . | |
| 7558 | 1/1977 | Japan | 414/908 |
| 202222 | 11/1983 | Japan | 414/331 |
| 8703274 | 6/1987 | PCT Int'l Appl. . | |

*Primary Examiner*—Frank E. Werner
*Attorney, Agent, or Firm*—Shea & Gould

[57] ABSTRACT

The invention relates to a method and apparatus for removing conical yarn bobbins, particularly in relation to withdrawing them from a conveyor belt which receives and moves said conical bobbins after they have been doffed and discharged from the units of a bobbin producing textile machine, and depositing them in an ordered arrangement on a peg trolley. The apparatus comprises essentially:

a shelf-like collection station on which there is fixed at least one sufficiently inclined cradle-shaped roller track for laterally guiding the full bobbins leaving the conveyor belt;

a portal manipulator unit with a pendant arm provided with a pin-type gripper which penetrates and withdraws several bobbins one behind the other to transfer them from their prepared-for-withdrawal position to their ordered deposition position by means of vertical and horizontal translational movements and rotational movements generated and coordinated by drive sources which are activated and controlled, moment by moment, by a control unit;

a control unit based on a miniprocessor into which an operating program and a set of operating data for computerized positioning are fed. Said control unit also comprises a computing center which determines and memorizes the number of bobbins to be deposited in an ordered arrangement on the pegs of the creel trolley, progressively compares the deposited number of bobbins with the memorized number, and generates a luminous and/or acoustic end-of-cycle signal when the number of bobbins deposited equals the number memorized.

8 Claims, 5 Drawing Sheets

APPARATUS FOR REMOVING YARN BOBBINS AND DEPOSITING THEM ON A PEG TROLLEY

The invention relates to an apparatus and method for withdrawing, transferring and arranging in an ordered manner on the pegs of a creel trolley a plurality of conical yarn bobbins removed from a textile machine by conveyor belts.

More particularly, the invention relates to the removal of cross-wound conical bobbins originating from a textile winding machine and locating them in an ordered arrangement on the pegs of a creel trolley by which they are conveyed along length paths to subsequent processing regions.

At the end of the spinning process, the yarn product is generally available in the form of cross-wound bobbins. These bobbins can be of any shape and size, and in the description and claims given hereinafter they are known for simplicity as textile bobbins, cross-wound bobbins or yarn packages, these terms being used interchangeably.

In textile, woollen or cotton mills, the removal of bobbins from winding machines or rotor spinning machines is an operation which for the purpose of further overall rationalisation should be mechanised and automated. In this respect, in spite of the very high level of machine automation, the manual operations involved in removing the bobbins from the conveyor belt and depositing them on the creel trolley can substantially damage the bobbins, leading to a loss of produce quality.

The object of the present invention is to completely eliminate the manual operations involved in the withdrawal, transfer and orderly storage of bobbins, in particular conical bobbins, so as to prepare them in a simple and rational manner for subsequent internal or external transfer. A further object is to solve the manipulation problem in an optimum manner in terms of operational efficiency, constructional economy and operational reliability.

In the known art, using a manual procedure the operator responsible for discharging the bobbins withdraws them from the conveyor belt and mounts them on the pegs of a creel trolley or places them in a collection bin, or alternatively the bobbins handled by the conveyor belt are poured randomly into containers located under its end. In this latter case the bobbins fall freely into the bin container, and the impact is such as to damage the outer yarn layer with consequent product quality deterioration. After this randmom storage, considerable labour is required to extract them for the subsequent production stages. From the aforegoing it is apparent that the current method and plants require considerable manual labour, with its high inherent cost. Moreover, this represents heavy and repetitive work. Some semi-automatic or automatic devices have already been proposed in an attempt to solve the problem of discharging the completely wound bobbins from textile winding machines. For example, Japanese patent application No. 169132/82 proposes an apparatus which provides essentially for the use of an elevating device for receiving bobbins withdrawn from a conveyor belt and conveying them one by one to an overhead conveyor or the like. Overhead conveying by means of boat-shaped containers or the like requires a complicated internal transport system and a distribution system which is difficult to operate. In this respect a further complication of this apparatus for discharging bobbins from a rotor spinning machine and/or winding machine is the cost of the handling and automation system for the downstream areas to which the bobbins are being fed.

In addition, if an analysis is made of the best relationship between the conveyor belt speed, the pitch of the boat-like containers and the lifting speed of the bobbin elevator, the individual bobbin withdrawal time is found to be somewhat high and the entire system somewhat complicated and costly. A further previous proposal, German patent No. 3244925, is based on handling the bobbins by means of a forked gripper using a single conveyor belt. Each bobbin has its own withdrawal and transfer cycle, and the associated intermittent handling for discharge purposes means that the device is slow and therefore considerably penalises the production efficiency of the winding machine. It is a well known fact that while the conveyor belt is moving the winding units are unable to discharge (and therefore some are unable to produce), and thus the movement time involved in the conveyor belt discharge must be as short as possible. In order to reduce the overall time taken for discharging the bobbins from said conveyor belt and thus maximise the production of wound yarn along all the collection units of the entire winding machine it is therefore necessary to pick up several bobbins simultaneously. According to the present invention, the aforesaid drawbacks are obviated by an extremely simple method and apparatus for withdrawing and transferring conical or cylindrical yarn bobbins and depositing them in an ordered arrangement on the pegs of a single or double sided creel trolley.

The apparatus proposed herein offers a series of advantages which on the one hand rationalise the accumulation and storage of yarn bobbins and on the other hand considerably lighten the work of the service personnel.

In this respect, with the apparatus of the present invention the service personnel are required only to replace the wheel-mounted peg trolley with an empty one when filled with yarn bobbins in an ordered arrangement. This is easily done with little effort given the easy manoevrability and mobility of such wheel-mounted trolleys. A further advantage is that the creel trolleys can be easily unloaded by any simple manipulator, as the presence of the pegs means that the position of the bobbins is defined exactly. The entire apparatus of the present invention is simple to maintain and service, this certainly being within the scope of the service personnel. There is little possibility of mechanical faults arising as the assembly provides only two cartesian movements plus a simple angular rotation of the pin-type gripper. A further important advantage is the very low investment and maintenance cost of the entire apparatus. Adaptation to existing winding machines is possible at small expense. These and further advantages are attained by the apparatus of the present invention, characterised by comprising two integrated operating units, namely:

- a shelf-like collection station on which there is fixed a sufficiently inclined cradle-shaped roller track for laterally guiding the full bobbins leaving the conveyor belt;
- a portal manipulator unit with a pendant arm provided with a pin-type gripper which penetrates and withdraws several bobbins one behind the other to transfer them from their prepared-for-withdrawal position to their ordered deposition position by means of vertical and horizontal translational movements and rotational movements generated and coordinated by drive sources which are activated and controlled, moment by moment, by a control unit.

According to one embodiment, the roller track fixed to the shelf-like collection station assumes a sufficiently inclined position when it halts in front of the conveyoy belt exit at the stage in which the conical bobbins undergo preparation for their withdrawal and a horizontal position at the commencement of the stage in which the conical bobbins are actually withdrawn by the pin-type gripper.

According to a further embodiment, mechanical confrontation elements of suitable shape project in suitable positions between the rollers after the preparation of the bobbins for withdrawal but before the commencement of insertion of the pin, in order to raise each bobbin in a region close to its minor diameter so as to horizontally align the axes of said conical bobbins along a single straight line.

According to a further embodiment, the group of bobbins is transferred from the gripper pin to the peg of the creel trolley by the forced action of an expulsion blade driven by activating a thrust actuator.

According to a further embodiment, the roller track of the shelf-like collection station is substantially of V-shaped cross-section.

According to a further embodiment, the drive sources which move the pendant arm carrying the pin-type gripper are activated and coordinated by a control unit based on a miniprocessor to which a series of operating data for programmable computerised positioning is fed by a control keyboard.

According to a further embodiment, the control unit comprises a computing centre which determines and memorises the number of bobbins to be deposited in an ordered arrangement on the pegs of the creel trolley, progressively compares the deposited number of bobbins with the memorised number, and generates a luminous and/or acoustic end-of-cycle signal when the number of bobbins deposited equals the number memorised.

With reference to the aforegoing, the drawing illustrate a preferred embodiment which is however not binding or limiting with regard to the relative positions of the components and any consequent simplifications deriving therefrom. Said embodiment is described hereinafter together with the method, with reference to the accompanying figures, of which.

In the figures, identical elements or elements with identical or equivalent functions carry the same reference numerals. The description of the apparatus and method given hereinafter is valid for the withdrawal of bobbins of any shape and size. Although conical bobbins are shown, only small variations in the position of the mechanical confrontation elements are required to enable the apparatus and method to be adapted to bobbins of cylindrical or other shape, these being always withdrawn in their entirety by insertion of the gripper pin, for deposition in an ordered arrangement on the pegs of a creel trolley.

On the accompanying drawings:

1 is the pin of the gripper 5 which is inserted into the bobbins through their central bore, to withdraw them one behind the other from their prepared position on the shelf-like collection station in order to transfer them in an ordered arrangement onto a peg of a creel trolley; 2a shows the roller track of cradle or concave shape which supports and prepares the conical bobbins on the shelf-like collection station, when in its inclined position at rest in front of the exit of the conveyor belt 12; 2b shows the preparation roller track when in its horizontal position awaiting bobbin withdrawal by the pin 1 of the gripper 5; 3 is the pendant arm or rod, the lower end of which carries the pin-type gripper 5; 4 is the fixed guide and connection portion of inclined plane to enable the bobbins 8 to be supported and to slide between the conveyor belt 12 and roller track 2a; 5 is the pin-type gripper for withdrawing conical bobbins by insertion into the tube which supports the cross-wound yarn; 6 is a photoelectric or similar sensor of known type which is activated on each passage of a full yarn bobbin 8, it being associated operationally with a counter of known type. Said sensor-counter assembly measures the number of passing bobbins, and when said number entering the roller track is equal to the programmed preparation number it stops the conveyor belt 12; 7 is drive source which vertically moves the pendant arm 3 and consequently the pin-type gripper 5; 9 is the drive source which horizontally moves the pendant arm 3 and consequently the pin-type gripper 5; 9a is an arrow indicating the direction and sense of horizontal advancement under the control action of the drive source 9 during the operating stage in which the gripper pin 1 is inserted into the aligned tubes of the group of bobbins; 7a is an arrow indicating the direction and sense of vertical descent of the pendant arm 3 under the control action of the drive source 7 during the stage in which the group of bobbins in positioned in front of the storage peg on the creel trolley; 7b is an arrow indicating the direction and sense of vertical lifting of the pendant arm 3 under the control action of the drive source 7 after forced expulsion of the bobbins 8a and 8b from the pin 1 and transfer onto the storage peg 24; 8 is a completely yarn-filled bobbin which is doffed from the spindle of the winding unit to be collected on the conveyor belt 12 which transfers it to the apparatus of the present invention in order to be placed on the pegs 24 of the creel trolley 22; 8a and 8b are the bobbins transferred by the belt 12 to the roller track in the position 2a during the stage in which the bobbins 8a and 8b are undergoing preparation for withdrawal on the collection station; 11 is the rod of the actuator 15; 12 is the conveyor belt by which the completely wound bobbins which have been doffed and discharged from the winding units are conveyed to the apparatus of the present invention for their ordered deposition; 12a is an arrow which indicates the direction and sense of advancement of the conveyor belt 12 during the stage in which bobbins are fed onto the roller track when in the position 2a; 14 is the blade which intercepts and arrests the bobbin 8a at the end of the roller track; 15 is the drive source which angularly displaces the roller track so as to position it in the position 2a or 2b. It consists of an actuator of pneumatic, hydraulic or electrical type or a combination of two or more of these types; 15a is an arrow indicating the direction and sense of vertical advancement of the rod 11 in angularly positioning the roller track as indicated by 2a; 15b is an arrow indicating the direction and sense of vertical descent of the rod 11 in horizontally positioning the roller track as indicated by 2b; 16 is the upper straight-axis cross-member of the portal structure of the apparatus of the invention; 18 is the vertical-axis upright of the portal structure of the apparatus of the present invention; 19 is the keyboard by which the operating data are fed in; 20 is a control unit based on a miniprocessor, of known type. It programs the operations in accordance with the instructions contained in the memory; 22 is the single-sided creel trolley used for transporting the bobbins 8; 24 is a peg which generally holds a number of bobbins one behind the other; 25 is the head of the textile winding machine; 26 is the actuator which inclines the pin to an inclination equal to that of the peg; 27 is the rod of the actuator 26; 26a and 26b are arrows indicating the movements of the rod 27 in subjecting the pin 1 to displacements of angular inclination about the peg 28; 34 is the actuator which operates the blade 26 which expels the bobbins 8a and 8b from the pin 1 in order to locate them on the peg 24; 36a is an arrow indicating the direction and sense of forced expulsion of the bobbins by the blade 36; 36b is an arrow indicating the return of the blade 36 to its original position; 30a and 30b are arrows indicating the substantially 90° rotations of the gripper 5 about the axis 30 in orientating the bobbins from their withdrawal position to their position in front of the pegs of the creel trolley 22; 32 is the support rod of the pin gripper 5; 29 is the support upright of the shelf-like collection station 10; 38 and 39 are the mechanical confrontation elements which raise the conical bobbins 8a and 8b at their minor diameter end to horizontally align the axes of said conical bobbins when these latter are resting on the roller track when in its position 2b; 40 is the actuator for adjusting the height of the mechanical confrontation elements 38 and 39, the degree of projection of which between the rollers of the roller track when in position 2b depends on the taper of the bobbins 8 to be withdrawn from the conveyor belt 12; 44 is the actuator which implements the rotations 30a and 30b; 42 is the protuberance which prevents one or both bobbins accidentally falling off the pin 1 during their transfer from the roller track when in position 2b to the peg 24 of the creel trolley 22. The preferred embodiment of the invention is described hereinafter with reference to the figures of the accompanying drawings. The apparatus of the present invention is arranged to withdraw yarn bobbins from a textile winding machine operating on one or more faces, and to deposit them on the pegs 24 of a wheel-mounted creel trolley 22 of the type normally used in textile mills for transporting bobbins. In a preferred application, the apparatus is arranged to be placed at the head of a rotor spinning machine or of any winding machine. Additionally, a device of known type can be provided for automatically replacing a creel trolley when full of bobbins with an empty creel trolley. If double-sided creel trolleys are used, a known device with a rotatable plate can be used for automatically changing the double loading face. When a predetermined number N of bobbins are located on the transfer belt, a signal is fed to the control unit 20 of the apparatus of the present invention, and this activates said belt 12 ready for the discharge of the bobbins 8 lying on it. The bobbin number N is previously chosen as a submultiple of the number of bobbins to be loaded on the creel trolley, and fed into the memory. It is counted at the textile machine. The operating cycle for preparing the bobbins on the roller track in the position 2a commences only when a known sensor detects the presence of the creel trolley 22 in the position awaiting filling. On receiving this signal the control unit 20 activates the drive source for driving the conveyor belt 12 with the result that this moves with its upper branch advancing in the direction and sense indicated by the arrow 12a.

Figures 1, 2:
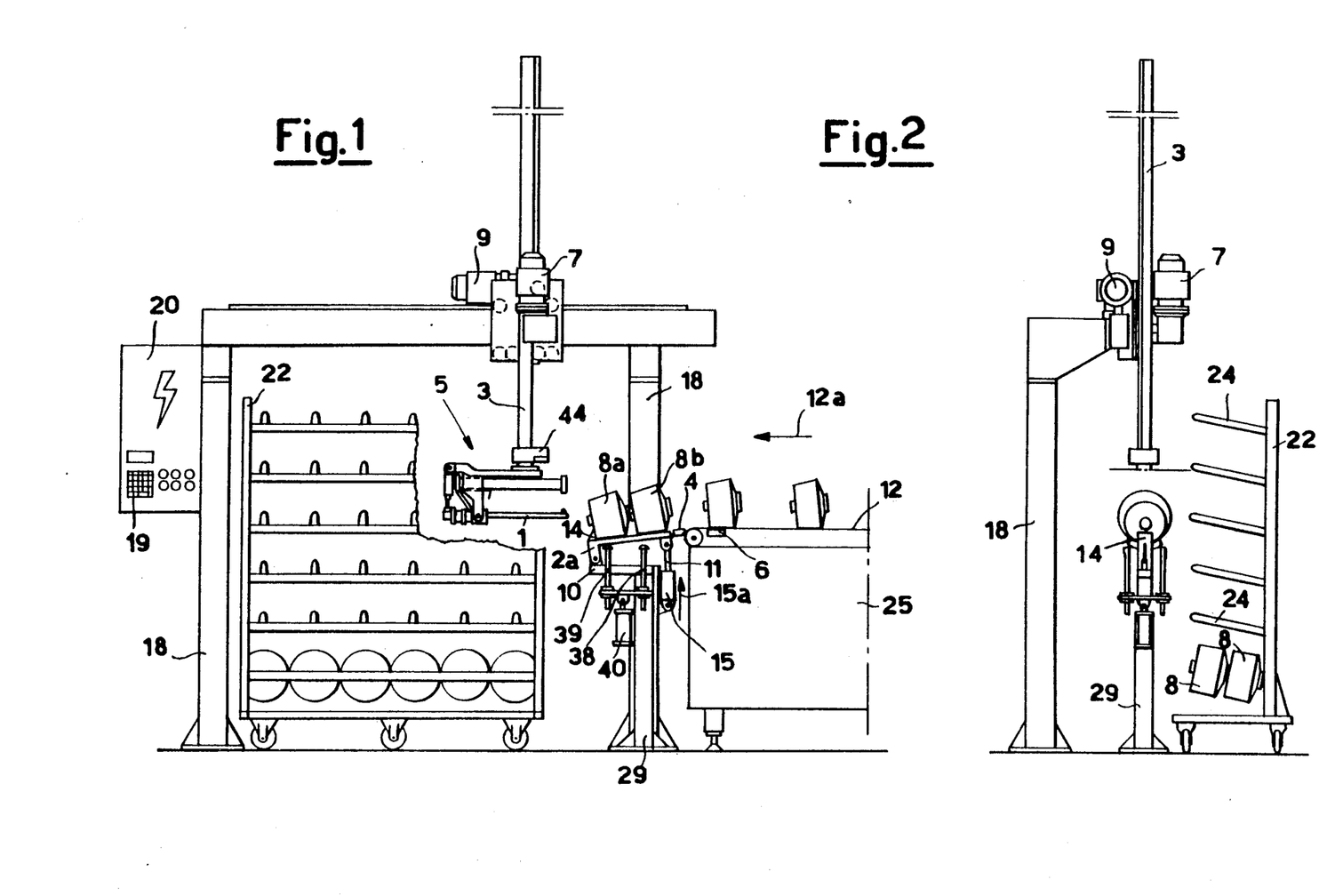
FIG. 1 is a diagrammatic front view of the apparatus of the present invention showing the operating configuration during the conveying of the yarn bobbins from the main conveyor belt to the roller track of the collection station by means of the pin-type gripper device while awaiting completion of preparation for withdrawal.
FIG. 2 is a diagrammatic side view showing the operating configuration during the stage illustrated in FIG. 1.
Figure 3:
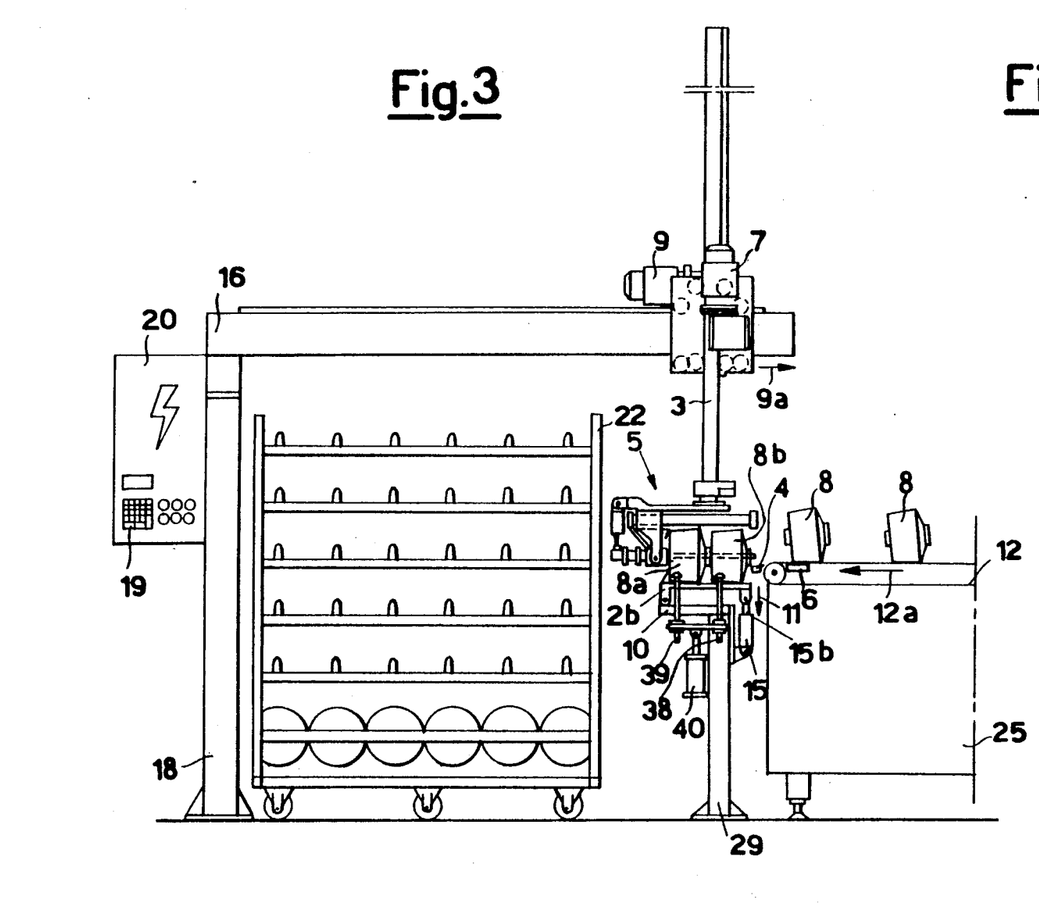
FIG. 3 is a diagrammatic front view of the apparatus of the present invention showing the operating configuration on completion of preparation for withdrawal and the commencement of actual withdrawal by the insertion of the pin gripper into the aligned bobbin tubes.
Figure 4:
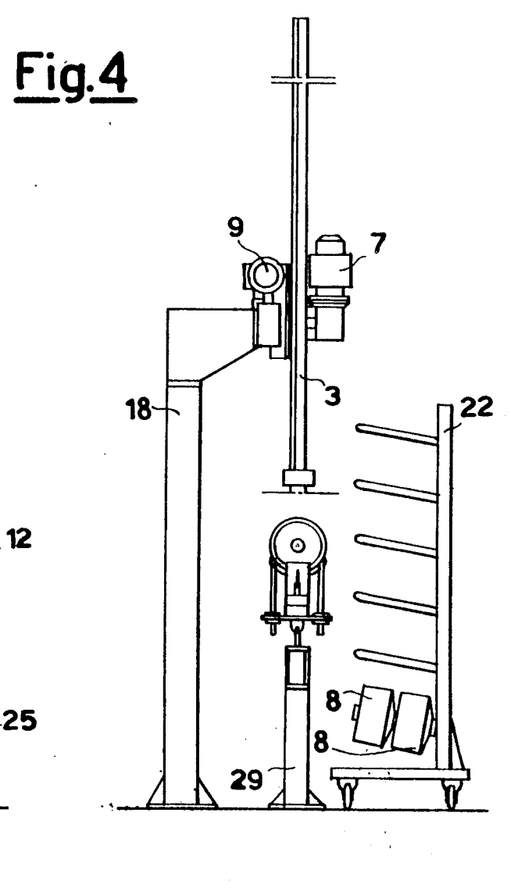
FIG. 4 is a diagrammatic side view showing the operating configuration in the condition illustrated in FIG. 3.
Figure 5:
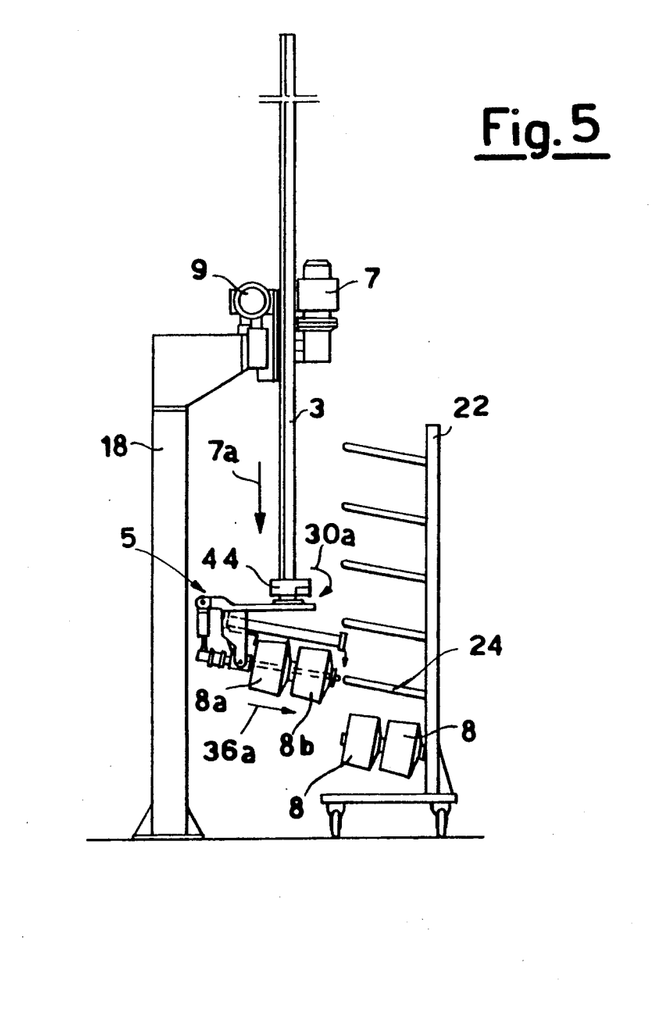
FIG. 5 is a diagrammatic side view of the apparatus of the present invention showing the operating configuration at the commencement of forced expulsion of the group of bobbins from the gripper pin for their transfer onto a storage peg of the creel trolley.
Figure 6:
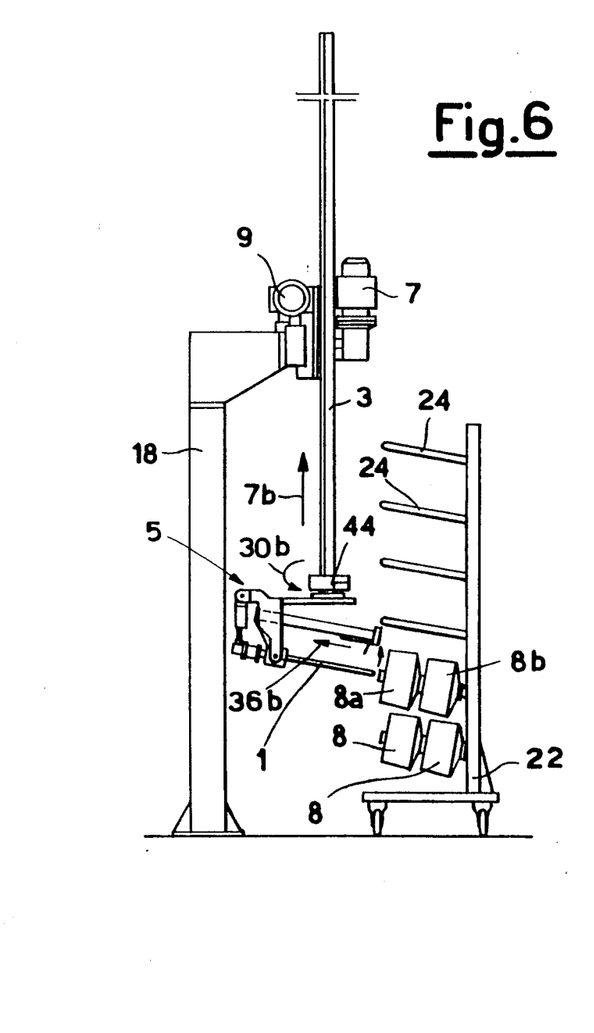
FIG. 6 is a diagrammatic side view of the apparatus of the present invention showing the operating configuration after the group of bobbins has been forcibly expelled from the gripper pin and transferred onto the peg of the creel trolley.
Figure 7:
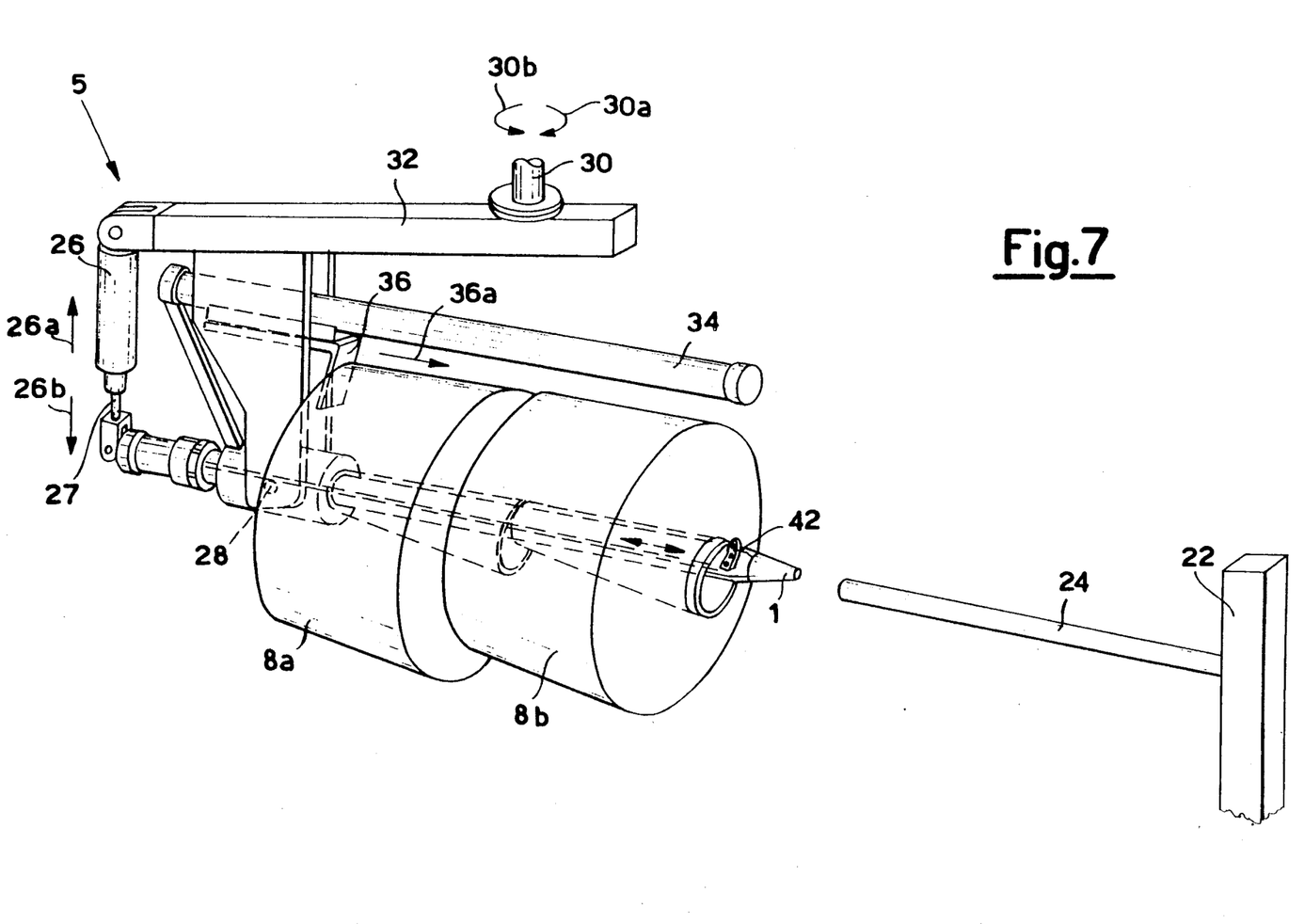
FIG. 7 is a diagrammatic isometric view of the pin-type gripper which holds and supports two conical bobbins to position them in front of the storage peg for the purpose of transferring them onto said peg by the forced action of an expulsion blade.
Figure 8:
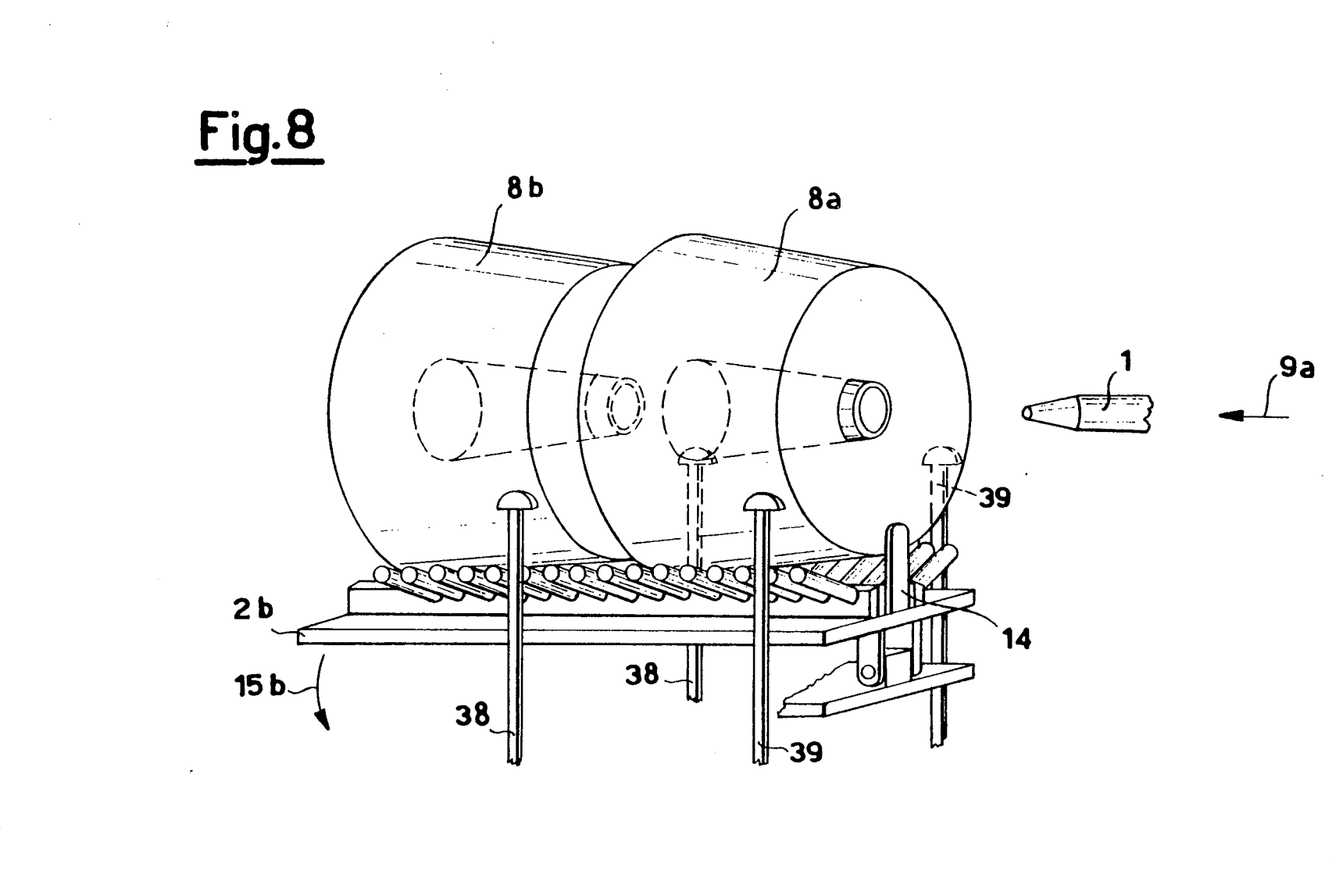
FIG. 8 is a diagrammatic isometric view of the mechanical confrontation elements projecting between the rollers of the preparation track when this latter assumes is horizontal position, to raise each conical bobin at its minor diameter end in order to horizontally align its axis with the axes of the bobbins present one behind the other in the group.

The bobbins 8 disengage from the conveyor belt 12 and slide by inertia and gravity along the fixed inclined-plane guide section 4 to reach the cradle-shaped roller track and commence the preparation of two bobbins 8a 8b one behind the other on said roller track in position 2a for their withdrawal. The interception element 14 consists of a blade which halts the bobbin 8a at the end of the roller track when in the sufficiently inclined position 2a. The sensor-counter block 6 positioned in proximity to the end of the conveyor belt 12 counts the bobbins which pass, and each time two pass it produces a signal which causes said conveyor belt 12 to stop. The two bobbins which have passed form on the roller track inclined in position 2a a group representing a single entity for handling purposes. The formation of the group of bobbins with the roller track stationed in its inclined position 2a in front of the exit of the conveyor belt 12 is illustrated diagrammatically in FIGS. 1 and 2. With the conveyor belt at rest, the operating cycle involving withdrawal and deposition in an ordered arrangement on the trolley pegs takes place in the following operational stages:

activation of the drive source 15 so that its rod 11 angularly moves the roller track to position it in the position 2b, the angular rotation being such that said roller track assumes a horizontal position (see FIG. 3 and FIG. 4);
  confirmation by a contact microswitch or like element that the roller track and thus the group of conical bobbins 8a and 8b have assumed their horizontal position. In this respect these latter are positioned with their axis horizontal by the action of the mechanical confrontation elements 38 and 39. Activation of the drive source 9 (see FIG. 8);

translation of the pendant arm 3 in the direction of the arrow 9a to insert the pin 1 into the aligned tubes of the group of bobbins 8a and 8b until the end of said pin projects beyond the group sufficiently to enable the stop protuberance 42 to emerge;

activation of the drive source 7 and vertical raising of the pendant arm 3 through a short distance sufficient to enable the bobbins 8 not to interfere with the mechanical confrontation elements 38 and 39. After this raising, the drive source 44 is activated to rotate the group of bobbins through 90° to face the trolley;

movement of the pendant arm 3 by activating the drive sources 7 and 9, which are activated and coordinated by the control unit 20, in order to position the group of bobbins 8a and 8b such that the axis of the pin 1 is frontally aligned with the axis of the peg 24;

activation of the actuator 26 which by moving its rod 27 inclines the pin 1 to an inclination equal to that of the deposition peg 24 (see FIG. 5 and FIG. 7);

retraction of the stop protuberance;

activation of the actuator 34, which operates the blade 36 for expelling the bobbins 8a and 8b from the pin 1 in order to locate them, by thrust action, on the peg 24 (see FIG. 6).

Simultaneously with said movement of the pendant arm 3 for positioning the bobbins 8a and 8b in front of the peg 24, the drive source 15 is activated so that its rod 11 angularly displaces the roller track from the horizontal position 2b to the inclined position 2a.

When this angular displacement has been made and the roller track is in the position 2a extending from the exit end of the conveyor belt 12, the drive source for the conveyor belt 12 is activated so that this latter moves with its upper branch advancing in the direction and sense indicated by the arrow 12a, so as to again feed a group of bobbins 8a and 8b onto the roller track when in position 2a.

When the bobbins 8a and 8b have been expelled from the pin 1 and mounted on the peg 24 in the aforesaid manner (see FIG. 6), the blade 36 is returned to its initial position in the direction of the arrow 36b and the actuators 26 and 44 are simultaneously activated together with the drive sources 7 and 9 to return the pin gripper to its position for withdrawing the new group of bobbins which in the meantime has formed on the roller track in position 2a.

The next operating cycle then proceeds, involving withdrawal followed by deposition in accordance with the new deposition coordinates associated with the position of the new peg. This is all coordinated by the control unit 20.

When the control unit 20 has implemented the number of operating cycles required to complete the ordered deposition of the bobbins 8, a luminous or other warning signal indicates that the creel trolley 22 is full, this signal ceasing when this latter has been replaced. Although the invention has been described in terms of withdrawing textile bobbins from a conveyor belt of a winding machine, transferring them and depositing them on the pegs of a creel trolley, it can be advantageously applied to the exit of two conveyor belts of a rotor spinning machine by merely using a double roller track, or can be applied to terminal regions of internal bobbin transportation systems within the mill and therefore serve several winding machines. A preferred embodiment has been described herein. It is however apparent that other embodiments are possible which fall within scope of the present invention.

Thus different drive arrangements can be provided; it is also possible to use a single drive source instead of the two drive sources 7 and 9; it is likewise possible to add or subtract drive sources in order to advantageously coordinate the combination of the various operating stages.

These and other modifications are possible without leaving the scope of the invention.

I claim:

1. A device for transferring annular frustoconical bobbins having a major diameter, a minor diameter and a bore therethrough, from a conveyor belt of a textile machine to pegs of a creel trolley, comprising:

(a) a collection station having at least one roller track capable of holding two or more bobbins for laterally guiding the bobbins from the textile machine, wherein said roller track is movable from an inclined position for accepting said bobbins from the conveyor belt to a horizontal position for removal of the bobbins by incline means, and wherein said collection station further comprises confrontation elements movable by activation means for raising each bobbin close to its minor diameter for axially aligning the bobbins; and (b) a portal manipulator unit having a pendant arm, a drive means associated with and driving said pendant arm, and a control unit associated with and controlling said drive means, wherein said pendant arm further comprises a gripper mechanism having a pin for inserting into said bore of at least two of the bobbins on said collection station when said roller track is in its horizontal position and the bobbins are axially aligned by the confrontation elements and positioning said at least two of the bobbins in an axially aligned relationship from said collection station onto the pegs of the creel trolley by means of vertical, horizontal, and rotational translations of said gripper by said drive means associated with said pendant arm controlled by said control unit.

2. The device of claim 1, wherein said gripper mechanism further comprises an expulsion blade and an expulsion blade actuator for pushing the bobbins from said pin of said gripper mechanism to the peg of the creel trolley, wherein said expulsion blade is driven by said expulsion blade actuator.

3. The device of claim 2, wherein said control unit of said portal manipulator unit further comprises a data input and a signal output for signalling when the number of bobbins deposited on the creel trolley equals the number entered in said data input.

4. The device of claim 1, wherein said roller track of said collection station has a substantially V-shaped cross section for cradling the bobbins.

5. The device of claim 1, wherein said control unit of said portal manipulator unit further comprises a data input and a signal output for signalling when the number of bobbins deposited on the creel trolley equals the number entered in said data input.

6. The device of claim 5 or 3, wherein said signal output comprises an optical signal output.

7. The device of claims 5 or 3, wherein said signal output comprises an acoustic signal output.

8. The device of claim 1, wherein the confrontational elements comprise a pair of vertical pins associated with each bobbin on the roller track, said vertical pins each having upper bobbin engagement heads, located on opposite sides of each bobbin whereby said vertical pins are raised and lowered by said activation means to provide horizontal, axial alignment of the bobbin bores.

* * * * *